(12) United States Patent
Chinniah et al.

(10) Patent No.: US 6,283,623 B1
(45) Date of Patent: Sep. 4, 2001

(54) METHOD AND APPARATUS FOR REMOTE LIGHTING

(75) Inventors: Jeyachandrabose Chinniah, Ann Arbor; Balvantrai Patel, Rochester Hills; Amir M Fallahi, W. Bloomfield, all of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/428,253

(22) Filed: Oct. 27, 1999

(51) Int. Cl.[7] ............................................. B60Q 1/00
(52) U.S. Cl. .................... 362/511; 512/554; 512/282; 512/322
(58) Field of Search .................... 362/282, 322, 362/511, 512, 552, 554

(56) References Cited

U.S. PATENT DOCUMENTS

| 4,868,718 | 9/1989 | Davenport et al. . |
| 4,949,227 | 8/1990 | Finch et al. . |
| 5,184,883 | * 2/1993 | Finch et al. ........................... 362/511 |
| 5,207,494 | * 5/1993 | Jones ..................................... 362/552 |
| 5,311,410 | 5/1994 | Hsu et al. . |
| 5,422,792 | * 6/1995 | Neumann ............................. 362/552 |
| 5,555,339 | 9/1996 | Migny et al. . |
| 6,152,577 | * 11/2000 | Rizkin et al. ......................... 362/552 |

FOREIGN PATENT DOCUMENTS

2238109 * 5/1991 (GB) ................................... 362/511

* cited by examiner

Primary Examiner—Sandra O'Shea
Assistant Examiner—Peggy Neils
(74) Attorney, Agent, or Firm—Visteon Global Tech.

(57) ABSTRACT

A remote lighting apparatus 10 having a light "collector" or reflector 12 which collects light rays or waves 14 that are generated by a light generating source 16. Apparatus 10 includes an optical conductor, conduit and/or guide 18 which operatively and selectively receives, communicates, and emits the "collected" light rays 14, a movable assembly 20 which is operatively connected to guide 18, and a pair of lenses or lens elements 22, 24. Apparatus 10 provides separate and/or multiple lighting functions or patterns by use of a single source 16 and a single optical guide 18.

15 Claims, 6 Drawing Sheets

METHOD AND APPARATUS FOR REMOTE LIGHTING

FIELD OF THE INVENTION

This invention generally relates to a method and an apparatus for remote lighting and more particularly, to a method and an apparatus for remote lighting having a source and an optical guide or cable which cooperatively provide multiple lighting functions, patterns, and/or intensities.

BACKGROUND OF THE INVENTION

Remote lighting systems are typically used to generate light and to communicatively "guide" the generated light to one or more locations which are remotely located from the light source. These systems are typically used in a wide variety of applications and devices, such as within vehicles, and include a light generating source, a "collector" which receives and/or collects the generated light, and one or more optical guides or fibers which communicatively guide or transmit the generated light to one or more locations remote from the source through the principal of "total internal reflection". The transmitted and/or guided light is emitted and/or projected onto a lens assembly which refracts the emitted light in a desired manner, thereby producing a desired intensity, pattern and/or lighting function (e.g., a "high beam" or "low beam" function).

For example and without limitation, in remote vehicular lighting systems, optical guides or fibers are adapted to selectively transmit light which is generated by a source within a vehicle to a vehicle's headlamps or "headlights". While these types of remote lighting systems provide advantages over non-remote type systems (e.g., they require less power consumption, provide greater light intensity, and are less susceptible to damage), they suffer from some drawbacks.

Particularly, these types of remote vehicular lighting systems generally require separate light generating sources to respectively produce a "low beam" and "high beam" headlamp function, intensity, and/or pattern. For example and without limitation, many of these vehicular lighting systems use separate or "stand-alone" lamps having conventional incandescent bulbs, to generate and/or provide a "high beam" type of light having a relatively high intensity and a distinct pattern. These separate lamps draw a relatively high amount of power which undesirably discharges and/or "drains" a significant amount of power or charge from the vehicle's battery. Other prior vehicular lighting systems use a single light emitting/generating source and separate guides or cables which cooperatively and selectively produce both high beam and low beam types of light or functions. The use of these separate and/or additional optical guides or cables undesirably increases overall system cost and increases the complexity and the likelihood of component failure in these systems.

There is therefore a need for a method and an apparatus for remote lighting which overcomes at least some of the various previously delineated drawbacks of these prior remote lighting systems; which employs a single source to provide multiple types of lighting functions and/or lighting patterns; which obviates the need for multiple fiber optic cables or guides; which performs different or multiple lighting functions; and which substantially minimizes the amount of power required to perform these multiple lighting functions and/or to selectively provide these multiple types of light.

SUMMARY OF THE INVENTION

It is therefore a primary object of the present invention to provide a method and an apparatus for remote lighting which overcomes some or all of the previously delineated disadvantages of prior remote lighting systems and assemblies.

It is second object of the present invention to provide a method and an apparatus for remote lighting which uses reduced amounts or levels of power.

It is a third object of the present invention to provide a method and an apparatus for remote lighting which includes a source and an optical guide or cable which cooperatively provide multiple lighting functions, patterns, and/or intensities.

According to a first aspect of the present invention, an apparatus for use with a remote lighting system of the type having a light generating source is provided. The apparatus includes a first optical guide which receives the generated light and which transmits the received light to a first location which is remote from the source. The optical guide is movable from a first position to a second position. The apparatus further includes a first lens which receives the light when the guide resides in the first position; and a second lens which receives the light when the guide resides in the second position.

According to a second aspect of the present invention, an apparatus for use with a remote lighting system of the type having a light generating source is provided. The apparatus includes a first optical guide which receives a portion of the generated light and transmits the received light to a location remote from the source; and a lens assembly having a first lens and a second lens. The first and second lenses are selectively movable from a first position in which a portion of the transmitted light passes through the first lens to a second position in which a portion of the transmitted light passes through the second lens.

According to a third aspect of the present invention, a method for remote lighting is provided. The method includes the steps of: providing a source for generating light; providing a conduit which receives the generated light and which emits the generated light from a first end; providing a first lens; providing a second lens; and selectively moving the first end between a first position in which a portion of the emitted light is coupled to the first lens and a second position in which a portion of the emitted light is coupled to the second lens.

Further objects, features, and advantages of the present invention will become apparent from a consideration of the following description and claims when taken in conjunction with the accompanying drawings.

BRIEF DESCRIPTION OF THE DRAWINGS

For a substantially fuller and more complete understanding of the nature and objects of the present invention, reference should be had to the following drawings in which.

DETAILED DESCRIPTION OF THE PREFERRED EMBODIMENT OF THE INVENTION

Figure 1:
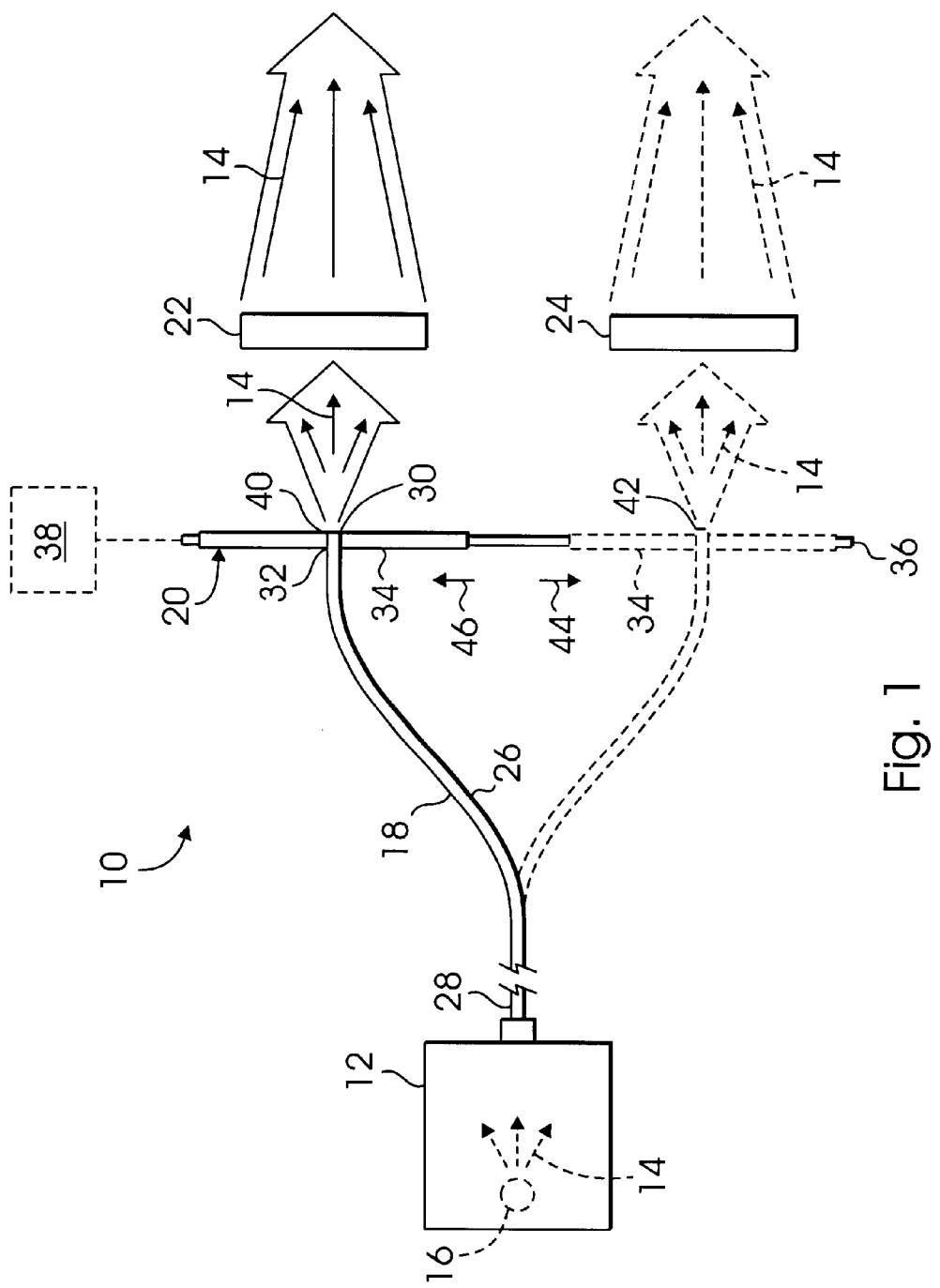
FIG. 1 is a top view of a remote lighting apparatus which is made in accordance with the teachings of a preferred embodiment of the invention.

Referring now to FIG. 1, there is shown a remote lighting apparatus 10 which is made in accordance with the teachings of the preferred embodiment of the invention. As shown, apparatus 10 is operatively and communicatively connected to a conventional light "collector" or reflector 12 which operatively receives and "collects" light rays or waves 14 that are generated by a conventional light generating source 16, and which allows the received light rays 14 to be selectively and communicatively output/transmitted by apparatus 10 in a manner which is more fully explained below. Apparatus 10 includes an optical conductor, conduit, fiber, cable, or guide 18 which operatively and selectively receives, communicates, and emits the "collected" light rays 14, a movable member or assembly 20 which perforatably receives conductor/guide 18, and a pair of lenses or lens elements 22, 24.

In one non-limiting embodiment, apparatus 10 is adapted for use within a conventional vehicle and may comprise and/or operate as part of a left front headlamp assembly of a vehicle. It should be appreciated that a substantially identical assembly 10 may be selectively used as part of a right front vehicle headlamp assembly, and/or as part of any other device or assembly from which different types of light patterns, intensities, colors, or shapes of light are desirably emitted, by use of a single light emitting source or location. Hence, the following discussion is equally applicable to right front vehicle headlamp assemblies and to any other types of light assemblies or devices.

In the preferred embodiment of the invention, optical guide 18 includes at least one and typically a plurality of substantially identical optical fibers or guides (not shown) which are respectively and collectively bundled or packaged in a relatively flexible and durable protective cover 26. Light receiving end 28 of guide 18 is mounted within collector 12 in a conventional manner, thereby allowing guide 18 to receive and transmit the light rays 14 which are generated by source 16 by use of the technique or principle of "total internal reflection". Light emitting "tip" or end 30 of guide 18 emits or projects the received light rays 14, and these projected light rays 14 selectively pass through and are refracted by lens elements 22, 24.

In the preferred embodiment of the invention, movable assembly 20 includes a movable frame or support member 34 which receives the light emitting end 30 of guide 18. As shown, end 30 protrudes through member 34 and more particularly, is fixedly coupled to or secured within an aperture 32 which is formed within member 34. Member 34 is movably and/or slidably engaged upon or within a track or rail member 36 which is fixedly coupled within a vehicle or other device or assembly within which the apparatus 10 operatively resides. Assembly 20 further includes a conventional motor/driver/controller 38 which is coupled to member 34 and/or rail assembly 36, and which selectively and operatively causes support member 34 to move within and/or upon rail member 36, between a first position 40 in which emitted light rays 14 are communicatively coupled to lens 22 and a second position 42 in which emitted light rays 14 are communicatively coupled to lens 24. While movable support member 34, rail member 36, and motor/driver/controller 38 are used in the preferred embodiment of the invention, it should be appreciated that any suitable type of device, assembly, and/or method for moving end 30 between position 40 and position 42 may be used within apparatus 10.

In the preferred embodiment of the invention, lens 22 comprises a conventional "low beam"-type vehicular headlamp lens and lens 24 comprises a conventional "high beam"-type vehicular headlamp lens. It should be appreciated that in other non-limiting embodiments, lenses 22, 24 may comprise any suitable or desirable types of optical lenses, such as lenses having or producing different colors, intensities, or patterns, or lenses having different shapes or sizes. In other alternate embodiments, lenses 22, 24 may further comprise one or more mirrors or reflective members which reflect light rays 14 in a predetermined and desired manner.

In operation, light rays 14 from source 16 are received by end 28 of guide 18 and are communicatively coupled and/or transmitted to end 30 of guide 18, where the light rays 14 are emitted. When end 30 resides in position 40, light rays 14 are communicatively coupled to and "pass through" lens 22 which in the preferred embodiment, provides a conventional "low beam" type of light. In order to use lens 24 (e.g., when a "high beam" type of light and/or a "high beam" type of headlamp function or pattern/intensity is desired or necessary), controller 38 selectively drives, forces, or moves support member 34 in the direction of arrow 44 which causes end 30 to move from position 40 to position 42, thereby operatively aligning light emitting end 30 with lens 24 and causing rays 14 to be communicatively coupled to and to operatively "pass through" lens 24. Controller 38 may also selectively force or drive member 34 in the direction of arrow 46, thereby causing end 30 to move from position 42 to position 40 (e.g., to switch from a "high beam" type of function back to a "low beam" type of function). In this manner, it should be appreciated that apparatus 10 provides separate and/or multiple lighting functions by use of a single light source 16 and a single optical guide or cable 18.

Figure 2:
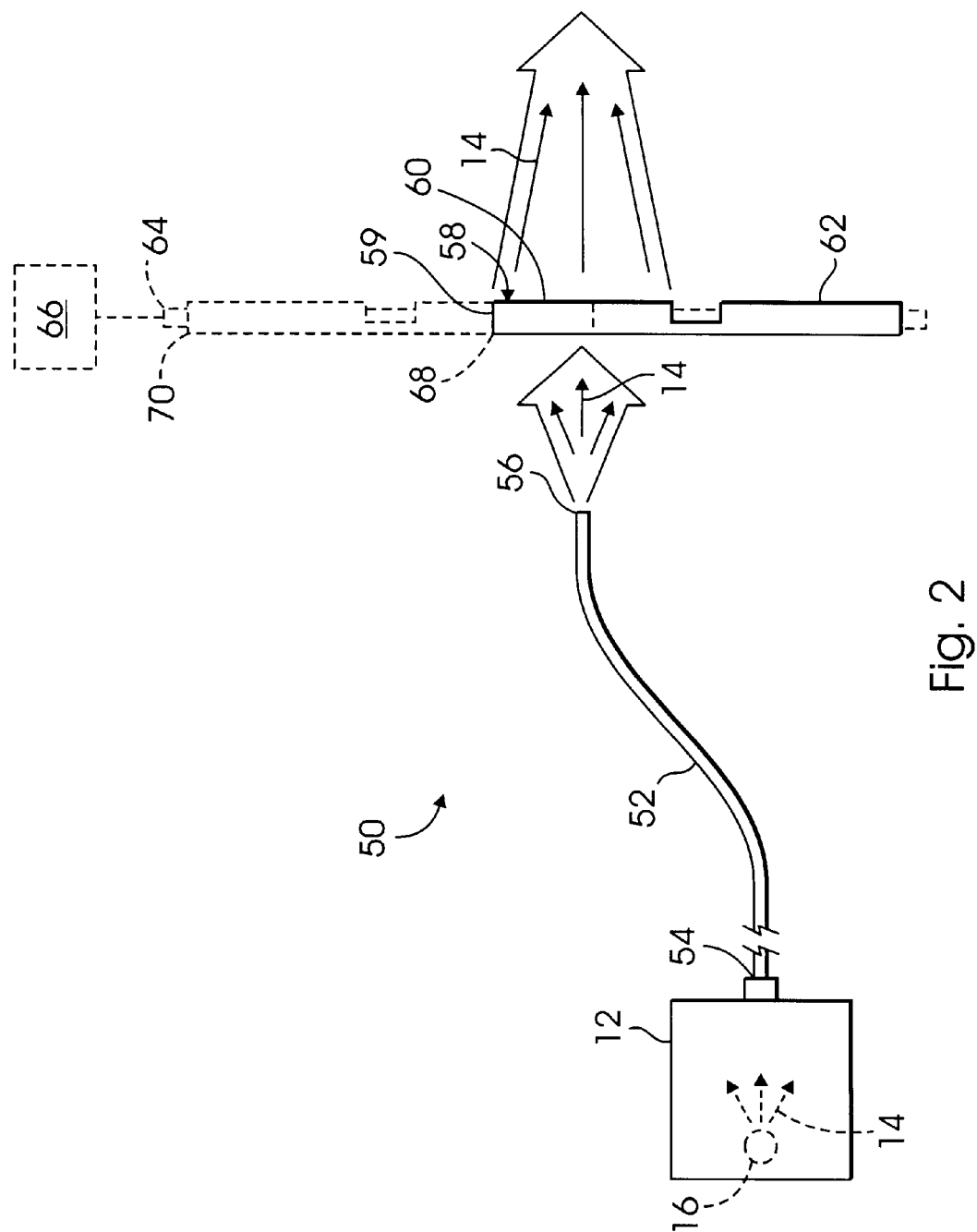
FIG. 2 is a top view of a remote lighting apparatus which is made in accordance with the teachings of a second embodiment of the invention.

Referring now to FIG. 2, there is shown a remote lighting apparatus 50 which is made in accordance with a second embodiment of the present invention. Components and/or portions of the apparatus 50 having the same reference numbers as found within apparatus 10, refer to the same respective components or portions as previously described with respect to apparatus 10.

As shown, apparatus 50 is operatively and communicatively coupled to collector 12 and to light source 16. Apparatus 50 includes an optical conduit and/or fiber and/or cable and/or guide 52 which is substantially identical in structure and function to guide 18. Guide 52 operatively and selectively receives the "collected" light rays 14 through a light receiving end 54 and transmits/emits the received light rays 14 from a light emitting end 56. End 56 may be fixedly mounted within a vehicle or other assembly within which apparatus 50 operatively resides, and is mounted in relative close proximity to a movable lens assembly 58.

Movable lens assembly 58 includes integrally formed lenses or lens elements 60, 62 which are each respectively and substantially similar to lenses 22, 24. In the preferred embodiment, assembly 58 (lenses 60, 62) are slidably engaged upon or within a conventional track, guide, or rail assembly 64. A conventional motor/driver/controller 66 is operatively coupled to assembly 58 and/or assembly 64 and selectively and operatively causes the edge 59 of lens 60 to move between a first position 68 in which light rays 14, which are emitted from end 56, are communicatively coupled to and "pass through" lens 60, and a second position 70 in which the emitted light rays 14 are communicatively coupled to and "pass through" lens 62. It should be appreciated that any suitable type of device, assembly, and/or method may be employed by apparatus 50 to move lenses 60, 62 in the described manner.

In one non-limiting embodiment of apparatus 50, lens 60 is a conventional "low beam"-type of vehicle headlamp lens and lens 62 is a conventional "high beam"-type of vehicle headlamp lens. It should be appreciated that in other embodiments, lenses 60, 62 may comprise any suitable or desirable types of optical lenses, such as lenses having or producing different colors, intensities, or patterns, or lenses having different shapes or sizes. In other alternate embodiments, lens elements 60, 62 may further comprise one or more mirrors or reflective members which reflect the operatively received light rays 14 in a predetermined and desired manner.

In operation, light rays 14 which are emitted from the light source 16 are received by end 54 of guide 52. The received light rays 14 are transmitted through guide 52 and are emitted at end 56. When the edge 59 of lens 60 resides in position 68, light rays 14 are communicatively coupled to and "pass through" lens 60, which in one non-limiting embodiment provides a "low beam" headlamp function or pattern. In order to employ lens 62 (e.g., when a "high beam" headlamp function, pattern, or type of light is desired or necessary), controller 66 selectively drives, forces, or moves assembly 58 (lenses 60, 62) in a conventional manner, thereby causing edge 59 to move from position 68 to position 70. In this manner, apparatus 50 aligns lens 62 with light emitting end 30 and causes the emitted rays 14 to be communicatively coupled to and to "pass through" lens 62. Controller 66 is adapted to selectively force or move lenses 60, 62 back to their original location in which edge 59 resides in position 68 (e.g., to switch from a "high beam" function back to a "low beam" function). In this manner, it should be appreciated that apparatus 50 provides separate and/or multiple lighting functions or patterns by use of a single source and a single optical guide or cable.

Figure 3:
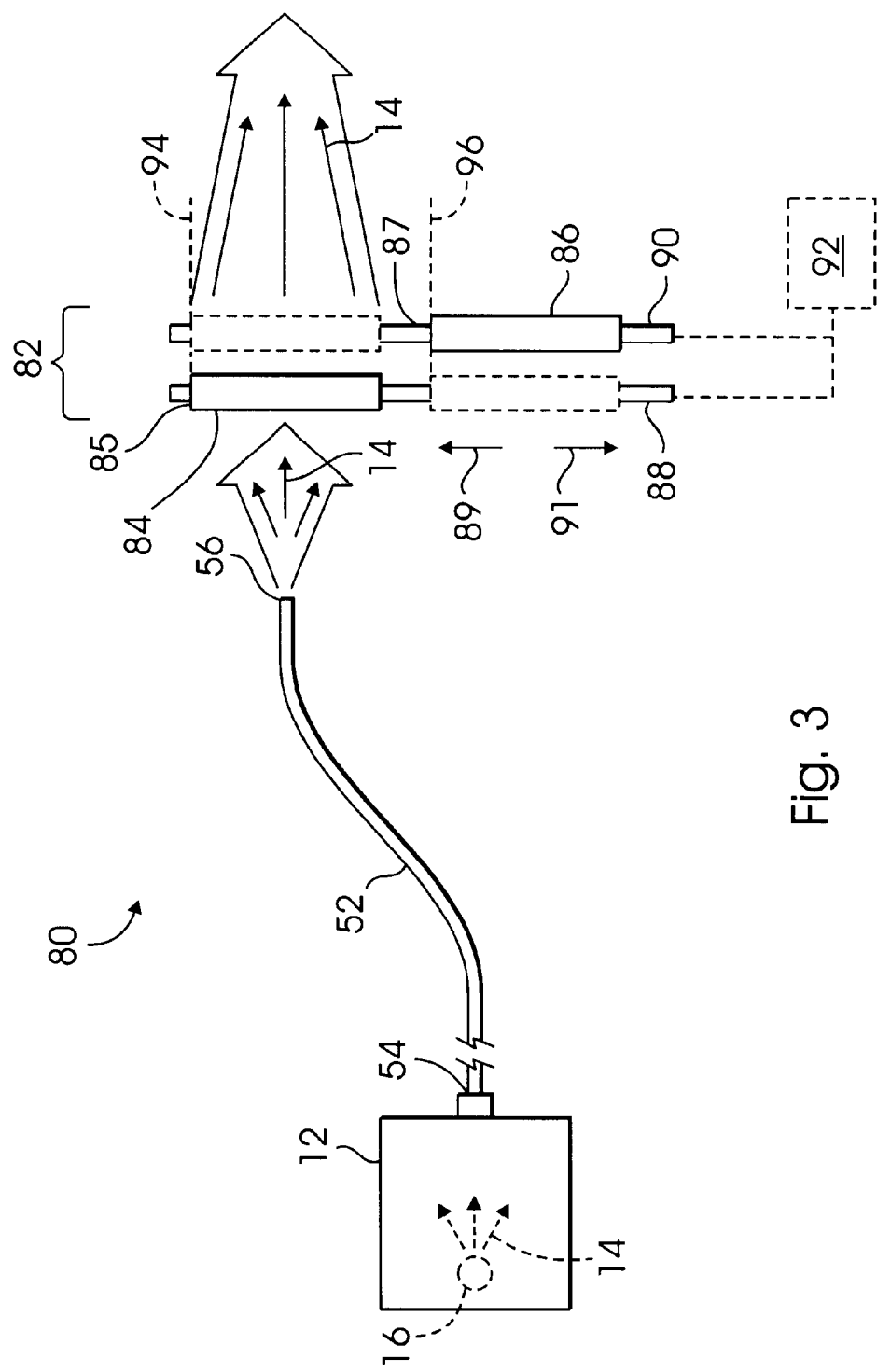
FIG. 3 is a side view of a remote lighting apparatus which is made in accordance with the teachings of a third embodiment of the invention.

Referring now to FIG. 3, there is shown a remote lighting apparatus 80 which is made in accordance with the teachings of a third embodiment of the present invention. Apparatus 80 is substantially similar to apparatus 50, except that the movable lens assembly 58 has been replaced with lens assembly 82. Hence, with the exception of lens assembly 82, apparatus 80 includes substantially identical components as apparatus 50. Components having a substantially identical structure and function are referred to by the same reference numerals within the apparatus 50 and 80.

In this alternate embodiment, lens assembly 82 includes independently movable lenses or lens elements 84, 86 which have independent and/or dissimilar focal lengths. In the preferred embodiment of the invention, lens elements 84, 86 are each respectively and slidably engaged upon or within a conventional track, guide, or rail assembly 88, 90. Rail 88 is linearly coextensive to rail 90 and the rails 88, 90 are mounted in a substantially parallel relationship to each other. Each rail assembly 88, 90 is operatively coupled to a conventional motor/driver/controller 92 which selectively and operatively causes each lens 84, 86 to move in the directions illustrated by arrows 89, 91. It should be appreciated that any suitable type of device, assembly, and/or method may be employed by apparatus 80 to move lenses 84, 86 in the described manner.

In one non-limiting embodiment of apparatus 80, lens 84 is a conventional "low beam"-type of vehicular headlamp lens and lens 86 is a conventional "high beam"-type of vehicular headlamp lens. It should be appreciated that in other embodiments, lenses 84, 86 may comprise any suitable or desirable types of optical lenses, and may further comprise one or more mirrors or reflective members which reflect light rays 14 in a predetermined and desired manner.

In operation, light rays 14 are emitted by end 56 of guide 52. Apparatus 80 utilizes lens 84 to selectively provide a "low beam" headlamp function by moving lens 84 in the direction of arrow 89 until the top edge 85 of lens 84 resides in position 94, and by moving lens 86 in the direction of arrow 91 until the top edge 87 of lens 86 resides in position 96, thereby causing light rays 14 to pass through lens 84. Alternatively, apparatus 10 utilizes lens 86 (e.g., to provide a "high beam" headlamp function) by moving lens 86 in the direction of arrow 89 until the top edge 87 of lens 86 resides in position 94, and by moving lens 84 in the direction of arrow 91 until the top edge 85 of lens 84 resides in position 96, thereby causing light rays 14 to be communicatively coupled to and to "pass through" lens 86. In this manner, apparatus 80 provides separate and/or multiple lighting functions or patterns by use of a single source and a single optical guide or cable. It should be further be appreciated that apparatus 80 provides these benefits while operating in a substantially smaller area or "space" than apparatus 50.

Figure 4:
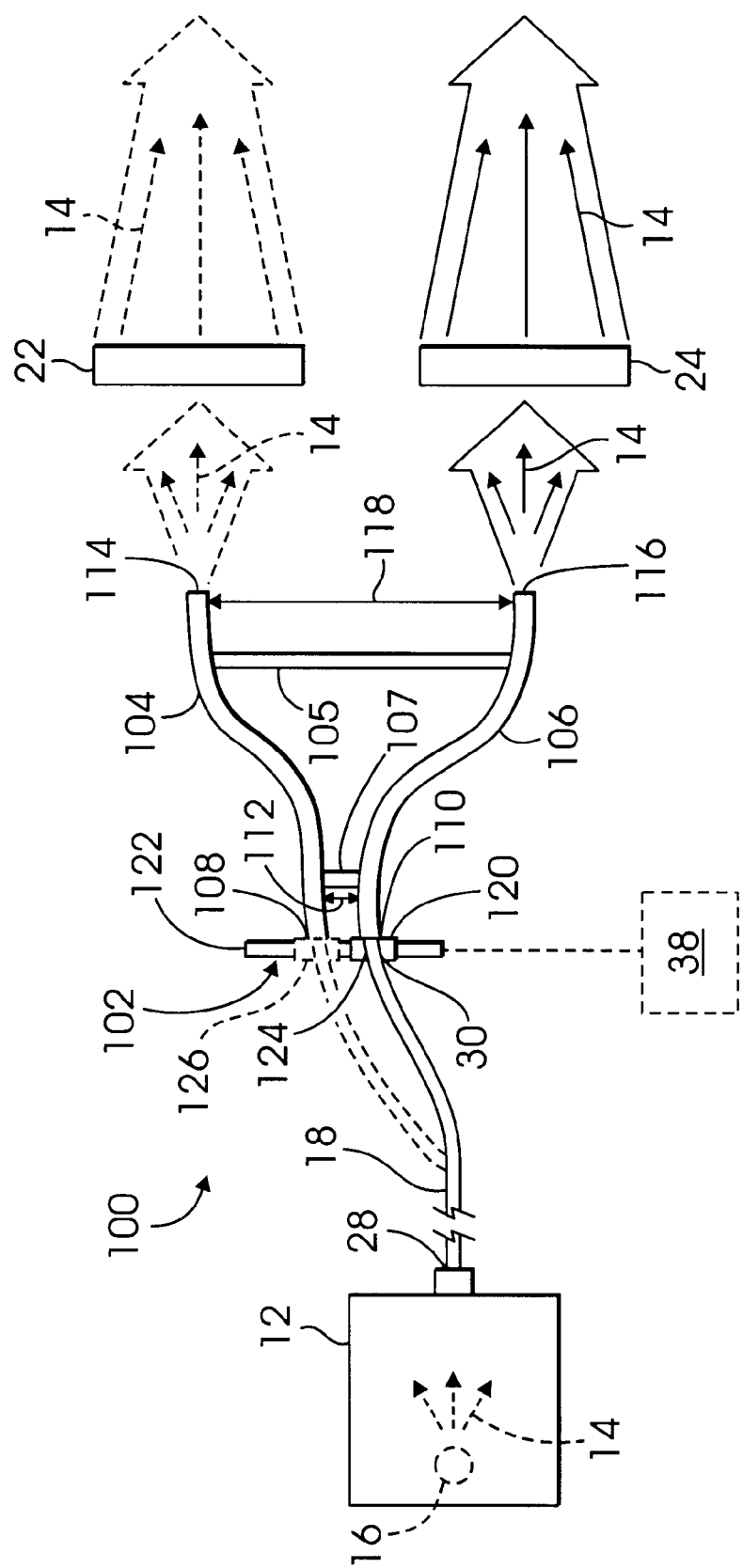
FIG. 4 is a top view of a remote lighting apparatus which is made in accordance with the teachings of a fourth embodiment of the invention.

Referring now to FIG. 4, there is shown a remote lighting apparatus 100 which is made in accordance with the teachings of a fourth embodiment of the present invention. Apparatus 100 is substantially similar to apparatus 10, except that the movable assembly 20 has been replaced with movable assembly 102 and stationary light guides 104, 106. With the exception of movable assembly 102 and light guides 104, 106, apparatus 100 includes substantially identical components as apparatus 10. Components and/or portions of apparatus 10 and 100 having a substantially identical structure and function are defined by the same reference numerals within FIGS. 1 and 4.

Stationary light guides 104, 106 are each bent or "curved" and cooperatively form a generally "wishbone" and/or a generally "Y"-shaped structure. Members 105, 107 are coupled to guides 104, 106 and provide structural support to the guides 104, 106, thereby allowing the guides 104, 106 to maintain their general "wishbone" shape. The respective light receiving ends 108, 110 of guides 104, 106 are preferably disposed and/or wholly contained within the same plane and are mounted in relative close proximity to each other. In one non-limiting embodiment, ends 108, 110 are separated by a distance 112. Guides 104, 106 extend or "curve" away from each other over their respective lengths and have respective light emitting ends 114, 116 which are separated by distance 118. In one non-limiting embodiment, distance 118 is substantially greater than distance 112.

Movable assembly 102 is substantially similar to member movable assembly 20 and includes a movable frame or support member 120 which perforatably receives and is coupled to light emitting end 30 of guide 18. Member 120 is slidably engaged upon or within a track or rail assembly 122. Controller 38 is communicatively coupled to member 120 and/or assembly 122 and selectively and operatively causes support member 120 to move between a first position in which end 30 is aligned with end 110 of guide 106, thereby causing the emitted light rays 14 to be communicatively coupled to and to "pass through" light receiving end 110 and to be transmitted by guide 106, and a second position in which end 30 is aligned with end 108 of guide 104, thereby causing emitted light rays 14 to be communicatively coupled to and to "pass through" light receiving end 108 and to be transmitted by guide 104.

In operation, light rays 14 from source 16 are emitted from end 30 of guide 18. When movable assembly 102 resides in position 124, light rays 14 are communicatively coupled to and "pass into" end 110 of guide 106, are emitted through end 116, and are communicatively coupled to and "pass through" lens 24. In order to employ lens 22, controller 38 selectively drives, forces, or moves end 30 from position 124 to position 126, thereby aligning end 30 with end 108 of guide 104. Light rays 14 are transmitted by guide 104 and are emitted through end 114 which is aligned with lens 22, thereby causing light rays 14 to be communicatively coupled to and to "pass through" lens 22. In this manner, it should be appreciated that apparatus 100 provides separate and/or multiple lighting functions by use of a single source and a primary optical guide or cable. It should further be appreciated that due to the arrangement of light guides 104, 106, the amount of movement required to switch between lens 24 and lens 22 is substantially reduced (e.g., the distance that controller 38 moves member 120 to switch between lenses 22, 24, which is approximately equal to distance 112, is substantially less than the distance that controller 38 must move member 34 to switch between lenses 22, 24, which is approximately equal to distance 118).

Figure 5:
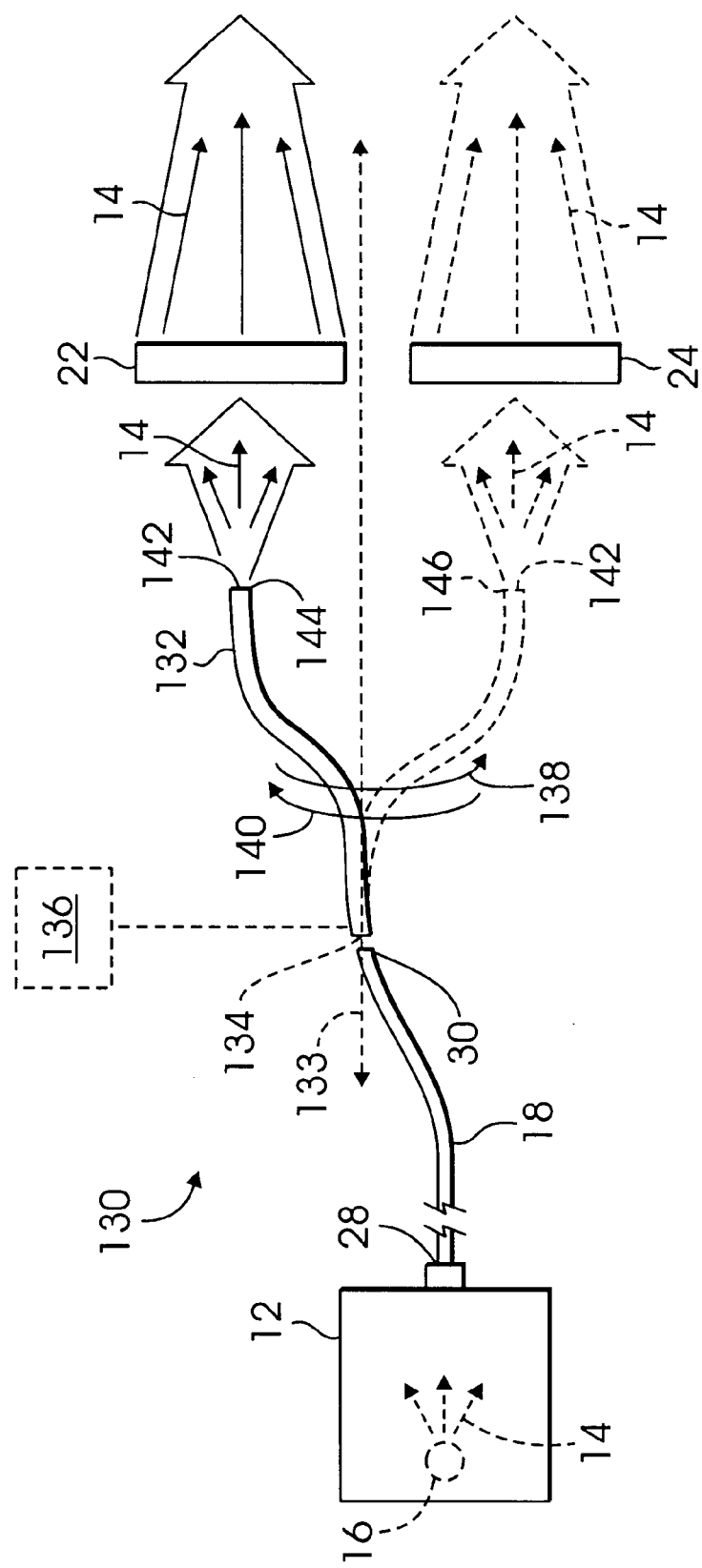
FIG. 5 is a side view of a remote lighting apparatus which is made in accordance with the teachings of a fifth embodiment of the invention.

Referring now to FIG. 5, there is shown a remote lighting apparatus 130 which is made in accordance with the teachings of a fifth embodiment of the present invention. Apparatus 130 is substantially similar to apparatus 100, except that movable assembly 102 and stationary light guides 104, 106 have been replaced by a single movable and/or rotatable light guide 132. With the exception of movable light guide 132, apparatus 130 includes substantially identical components as apparatus 100. Components having a substantially identical structure and function are defined by the same reference numerals within FIGS. 4 and 5.

Movable light guide 132 has a general serpentine shape and is generally bent or curved. Guide 132 is further adapted to receive, transmit, and emit light in a conventional manner. In one non-limiting embodiment, light guide 132 includes a light receiving end 134 which is rotatably mounted in relative close proximity to light emitting end 30 and is adapted to operatively receive light from end 30, transmit the received light, and emit the received light through a light emitting end 142. Guide 132 is operatively coupled to a conventional motor/driver/controller 136 which selectively drives and/or causes guide 132 to rotate about an axis 133 in the directions illustrated by arrows 138, 140.

In operation, light rays 14 are transmitted through guides 18 and 132 and are emitted from end 142 of guide 132. When guide 132 resides in position 144, light rays 14 are communicatively coupled to guide 132 and "pass through" lens 22. When lens 24 is desired to be used, controller 136 selectively and rotatably drives, forces, or moves guide 132 in the direction of arrow 138, thereby causing end 142 to move from position 144 to position 146 and causing rays 14 to "pass through" lens 24. Similarly, controller 136 moves guide 132 in the direction of arrow 140 to switch from lens 24 back to lens 22. In this manner, apparatus 130 provides separate and/or multiple lighting functions by use of a single source and an optical guide or cable (e.g., guide 18). It should further be appreciated that apparatus 130 provides the substantially same benefits as apparatus 100 while requiring less optical cable than apparatus 100.

Figure 7:
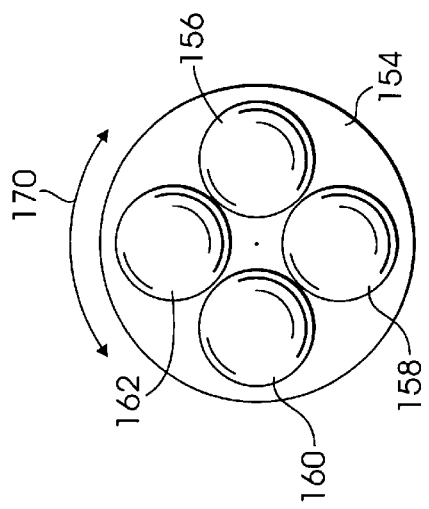
FIG. 7 is a view of the remote lighting apparatus which is shown in FIG. 6 and which is taken in the direction of arrow 7.
Figure 6:
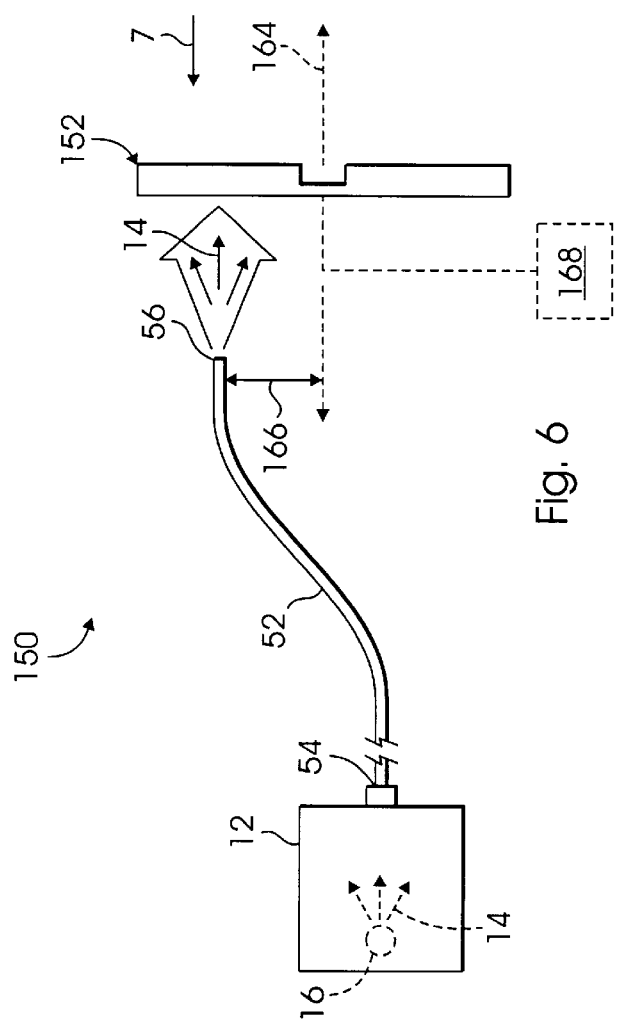
FIG. 6 is a side view of a remote lighting apparatus which is made in accordance with the teachings of a sixth embodiment of the invention.

Referring now to FIGS. 6 and 7, there is shown a remote lighting apparatus 150 which is made in accordance with the teachings of a sixth embodiment of the present invention. Apparatus 150 is substantially similar to apparatus 50, except that the movable lens assembly 58 has been replaced with rotating lens assembly 152. With the exception of lens assembly 152, apparatus 150 includes substantially identical components as apparatus 50. Components having a substantially identical structure and function are defined by the same reference numerals as the components of apparatus 50 delineated in FIG. 2.

In this alternate embodiment, lens assembly 152 includes a generally circular or disc-shaped member 154. In one non-limiting embodiment, four separate and generally circular lens elements 156, 158, 160, and 162 are integrally formed upon or are secured within member 154. In one non-limiting embodiment, lenses 156–162 each produce a different color, intensity, or pattern. In alternate embodiments, different numbers of lenses are mounted upon or are integrally formed within member 154, and/or different numbers of optical cables and/or discs may be used. Member 154 is conventionally and rotatably mounted about its axis of symmetry 164, which is disposed at a distance 166 below light emitting end 56 of cable 52. Member 154 is operatively coupled to a conventional motor/driver/controller 168 which selectively and operatively causes member 154 to rotate about axis 164 in the directions illustrated by arrows 170. It should be appreciated that any suitable type of device, assembly, and/or method may be employed by apparatus 150 to rotatably move member 154.

In operation, light rays 14 are emitted by end 56 of guide 52. Apparatus 150 rotatably moves member 154 in the directions illustrated by arrows 170 until a unique and desired one of lenses 156–162 is substantially aligned with the light emitting end 56 of guide 52, thereby selectively causing light rays 14 pass through the unique and desired lens 156–162. By rotating member 154 through controller 168, apparatus 150 may selectively use each of the lenses 156–162 to project the light rays 14 in a desired manner, intensity, or pattern. In this manner, apparatus 150 provides separate and/or multiple lighting functions or patterns by use of a single source and a single optical guide or cable.

It should be understood that this invention is not limited to the exact construction or embodiments listed and described, but that various changes may be made without departing from the spirit and scope of the invention.

What is claimed is:

1. An apparatus for use within a vehicle including a light source of the type which generates light, said apparatus comprising:

an optical conductor which receives said generated light and which emits said generated light, said optical conductor being movable from a first position to a second position;

a first vehicular headlamp lens which receives said emitted light from said optical conductor when said optical conductor resides in said first position;

a second vehicular headlamp lens which receives said emitted light from said optical conductor when said optical conductor resides in said second position;

a rail assembly which is disposed in relative close proximity to said first and second vehicular headlamps;

a member which movably disposed upon said rail assembly and which is coupled to said optical conductor; and a motor which is coupled to said member and which selectively moves said member, effective to cause said optical conductor to selectively reside in said first and second positions.

2. The apparatus of claim 1 wherein said optical conductor comprises a plurality of optical fibers.

3. The apparatus of claim 1 wherein said first vehicular headlamp lens comprises a low beam type of lens.

4. Thee apparatus of claim 3 wherein said second vehicular headlamp lens comprises a high beam type of lens.

5. The apparatus of claim 1 wherein said member comprises an aperture which selectively receives and secures a light emitting end of said conductor.

6. The apparatus of claim 1 wherein said motor comprises a controller.

7. A remote lighting system for use in a vehicle comprising:

a light generating source;

a first optical conduit which receives a portion of said generated light and transmits said received light to a location remote from said source;

a lens assembly having a first vehicular headlamp lens and a second vehicular headlamp lens, said first and second vehicular headlamp lenses being selectively movable from a first position in which a portion of said transmitted light passes through said first vehicular headlamp lens to a second position in which a portion of said transmitted light passes through said second vehicular headlamp lens;

a rail assembly on which said first and second vehicular headlamp lenses are slidably disposed; and a controller which is coupled to said lens assembly and which is effective to selectively move said first and second vehicular headlamp lenses between said first and second positions.

8. The apparatus of claim 7 wherein said first lens and said second lens are fixedly coupled together.

9. The apparatus of claim 7 wherein said rail assembly comprises a first and second rail member upon which said first vehicular headlamp lens and said second vehicular headlamp lens are respectively and movably disposed.

10. The apparatus of claim 9 wherein said first and said second rail members are mounted in a substantially parallel relationship.

11. A method for remote lighting for use within a vehicle comprising the steps of:

providing a source for generating light;

providing an optical guide which receives a portion of said generated light, transmits said received light to a remote location, and emits said received light from a first end;

providing a first vehicular headlamp lens;

providing a second vehicular headlamp lens; and selectively moving said first end between a first position in which a portion of said emitted light is projected from said first lens and a second position in which a portion of said emitted light is produced from said second lens.

12. The method of claim 11 further comprising the steps of:

providing a rail assembly;

providing a member which is slidably disposed upon said rail assembly;

coupling said first end to said member; and selectively moving said member on said rail assembly, effective to move first end between said first and second positions.

13. The method of claim 11 wherein said first vehicular headlamp lens comprises a low beam type lens.

14. The method of claim 11 wherein said second vehicular headlamp lens comprises a low high beam type lens.

15. The apparatus of claim 11 wherein said optical guide includes a first curved portion upon which said first end is disposed, said curved portion being selectively rotatable, effective to cause said first end to move between said first and said second position.

* * * * *